(12) United States Patent
Okuda et al.

(10) Patent No.: US 6,819,947 B2
(45) Date of Patent: Nov. 16, 2004

(54) FOLDABLE PORTABLE TELEPHONE

(75) Inventors: Tatsumi Okuda, Gifu (JP); Motoaki Mushiga, Gifuhashima (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 599 days.

(21) Appl. No.: 09/852,763

(22) Filed: May 11, 2001

(65) Prior Publication Data

US 2002/0032010 A1 Mar. 14, 2002

(30) Foreign Application Priority Data

May 12, 2000 (JP) ......................................... 2000-140479

(51) Int. Cl.⁷ .............................................. H04M 1/00
(52) U.S. Cl. .............................. 455/575.3; 455/575.1; 455/90.3; 379/433.01; 379/433.11
(58) Field of Search ........................... 455/575.1, 575.3, 455/575.4, 575.8, 90.1–90.3; 379/428.01, 433.01, 433.11, 433.12, 433.13

(56) References Cited

U.S. PATENT DOCUMENTS

| | | | | |
|---|---|---|---|---|
| 4,845,772 A | * | 7/1989 | Metroka et al. | ............. 455/574 |
| 5,493,690 A | * | 2/1996 | Shimazaki | ............... 455/575.3 |
| 5,918,188 A | * | 6/1999 | Doran | ...................... 455/575.3 |
| 6,011,699 A | | 1/2000 | Murray et al. | |
| 6,304,765 B1 | * | 10/2001 | Cosgrove et al. | ........ 455/575.3 |
| 6,570,596 B2 | | 5/2003 | Frederiksen | ................ 348/808 |

FOREIGN PATENT DOCUMENTS

| | | |
|---|---|---|
| JP | 2-44843 | 2/1990 |
| JP | 2000-036856 | 2/2000 |

* cited by examiner

Primary Examiner—Vivian Chin
Assistant Examiner—Tuan Tran
(74) Attorney, Agent, or Firm—Armstrong, Kratz, Quintos, Hanson & Brooks, LLP

(57) ABSTRACT

This invention provides a foldable portable telephone which comprises a main body case 1 provided with manual keys 12, and a closure case 2 connected to the main body case 1 by a hinge mechanism for covering the manual keys 12, and which is adapted to detect electrically the closure case 2 in its opened state or closed state relative to the main body case 1. The main body case 1 and the closure case 2 are respectively provided with barrel portions 14, 23 being aligned coaxially with an axis of rotation of the hinge mechanism. Opposed faces of the two barrel portions 14, 23 are respectively provided with contact pieces 4, 5. The two pieces 4, 5 are in contact with/away from each other corresponding to opening or closing the closure case 2, to detect electrically opened or closed state of the closure case 2.

5 Claims, 13 Drawing Sheets

FOLDABLE PORTABLE TELEPHONE

FIELD OF THE INVENTION

The present invention relates to foldable portable telephones comprising a main body case provided with a plurality of manual keys, and a closure case connected to the main body case openably, and more particularly to a foldable portable telephone which detects opening-closing of the closure case, and controls on/off based on the detection.

BACKGROUND OF THE INVENTION

FIG. 15 shows a foldable portable telephone which is already known and which is provided with a magnet 9 on one of a main body case 10 and a closure case 20, and is provided with a leaf-spring contact member 91 accommodated into a vacuum tube on the other case. With the foldable portable telephone, when the closure case 20 is closed toward the main body case 10, attraction of the magnet 9 brings contacts of the leaf-spring contact member 91 into being closed, to detect closure case 20 in its closed state.

As shown in FIG. 16, already known is a portable telephone comprising a main body case 10 which has a dome switch 93 incorporated therein and a closure case 20 which is formed with a projection 92 to depress the dome switch 93. With the foldable portable telephone, the closure case 20 is closed toward the main body case 10 causing the projection 92 to depress the dome switch 93 to bring the contacts into being closed, which detects the closure case 20 in its closed state.

However, with the foldable portable telephone shown in FIG. 15, there is need of large space for accommodating a magnet 9 and a leaf-spring contact member 91 entailing the problem of making the telephone large-sized in addition to the problem of costly leaf-spring contact member 91 which is accommodated in a vacuum tube.

On the other hand, the foldable portable telephone shown in FIG. 16 has the problem of being hazardous since the projection 92 is provided on the closure case 20. Furthermore, the dome portion of the dome switch 93 is made of rubber to have the portion impaired owing to age deterioration, so that there is likelihood that the contacts are remained closed not to be opened. Moreover, the dome switch 93 is switched on/off at a various position due to dimensions errors of the projection 92, therefore entailing the problem of impaired reliability of opening and closing detection.

SUMMARY OF THE INVENTION

An object of the present invention is to provide a foldable portable telephone which can be made compact, is inexpensive, and safe in eliminating a projection, and further has a high reliability for opening-closing detection.

The present invention provides a foldable portable telephone which comprises a main body case 1 provided with manual keys 12, and a closure case 2 connected to the main body case 1 by a hinge mechanism for covering the manual keys 12. Opened state or closed state of the closure case 2 relative to the main body case 1 can be electrically detected. The main body case 1 and the closure case 2 are provided respectively with barrel portions 14, 23 aligned coaxially with an axis of rotation of the hinge mechanism. Contact pieces 4, 5 are respectively provided on opposed faces of the barrel portions 14, 23. The two contact pieces 4, 5 are in contact with or away from each other corresponding to opening or closing of the closure case 2 to constitute an opening-closing switch.

The two contact pieces 4, 5 are connected to the opening-closing detection circuit described, electrically detecting the state of the two contact pieces 4, 5 being in contact with or being away from each other. The opening or closing state of the closure case 2 can be recognized due to the detection.

With the foldable portable telephone of the invention, the barrel portions 14, 23 rotate relative to each other according to action of closing the closure case 2 or to that of opening the closure case 2 to cause the two contact pieces 4, 5 to be in contact with or away from having the switch opened or closed, which detects opened or closed state of the closure case 2 owing to the opening-closing detection circuit described.

According to a specific embodiment, the two contact pieces 4, 5 of the two cases 1, 2 are provided at a position wherein the pieces can be slidably in contact with each other when the closure case 2 is closed. In this case, the closure case 2 is caused to be closed from opened state to cause the two pieces 4, 5 to be slidably in contact with each other to have the switch closed.

According to another specific embodiment, the contact pieces 4, 5 of the two cases 1, 2 are provided at a position wherein the pieces can be slidably in contact with each other when the closure case 2 is opened. In this case, the closure case 2 is caused to be opened from closed state to cause the pieces 4, 5 to be slidably in contact with each other to have the switch closed. With the specific construction, even if the closure case 2 is slightly opened, the switch is not closed, so that the user can confirm the caller with the closure case 2 slightly opened upon receiving a incoming call by setting to receiving a call when the switch is closed. Accordingly, the user may close the closure case 2 when an incoming call is placed by a caller to whom the user would not like to talk. This can save the power to be consumed.

Stated more specifically, the barrel portions 14, 23 of the two cases 1, 2 are respectively formed into a hollow cylinder which is coaxial with the axis of rotation of the hinge mechanism, and are slidably in contact with each other on the opposed faces. The contact pieces 4, 5 are respectively accommodated into the recessed portions 18, 26 formed into a depth corresponding to the thickness of the pieces 4, 5 on the opposed faces. Protruding portions 41, 51 formed on opposed faces of the two contact pieces 4, 5 are slidably in contact with each other. With the specific construction, the two barrel portions 14, 23 can be provided with the contact pieces 4, 5 with the barrel portions 14, 23 of the two cases 1, 2 slidably in contact with each other, so that the provision of the contact pieces 4, 5 does not make the portable telephone greater in size. Protruding portions 41, 51 formed on opposed faces of the contact pieces 4, 5 are slidably in contact with each other to have the switch reliably closed, whereby high reliability is obtained in the operation.

With the foldable portable telephone of the invention described, since the contact pieces 4, 5 for detecting opened-closed state of the closure case 2 are provided with use of the barrel portions 14, 23 originally formed on the junction of the main body case 1 and the closure case 2, the portable telephone can be made smaller than conventionally. Further, the two pieces 4, 5 can be respectively formed of a small metal piece, and expensive components are thus unnecessary, so that less expensive portable telephone can be provided than conventionally. Moreover, the two contact pieces 4, 5 are adapted to be provided between the opposed faces of the two barrel portions 14, 23, and the main body case 1 and the closure case 2 are not formed with a projection, hence safety. Furthermore, the opened-closed state of the closure case 2 is detected by the contact pieces 4, 5 of metal in contact with or away from each other, hence higher reliability.

DETAILED DESCRIPTION OF EMBODIMENTS

Figure 1:
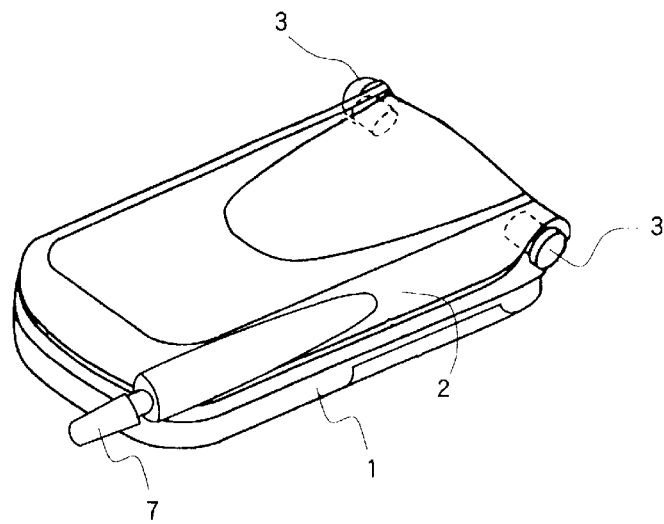
FIG. 1 is a perspective view of a foldable portable telephone of the present invention, with its cases closed.
Figure 2:
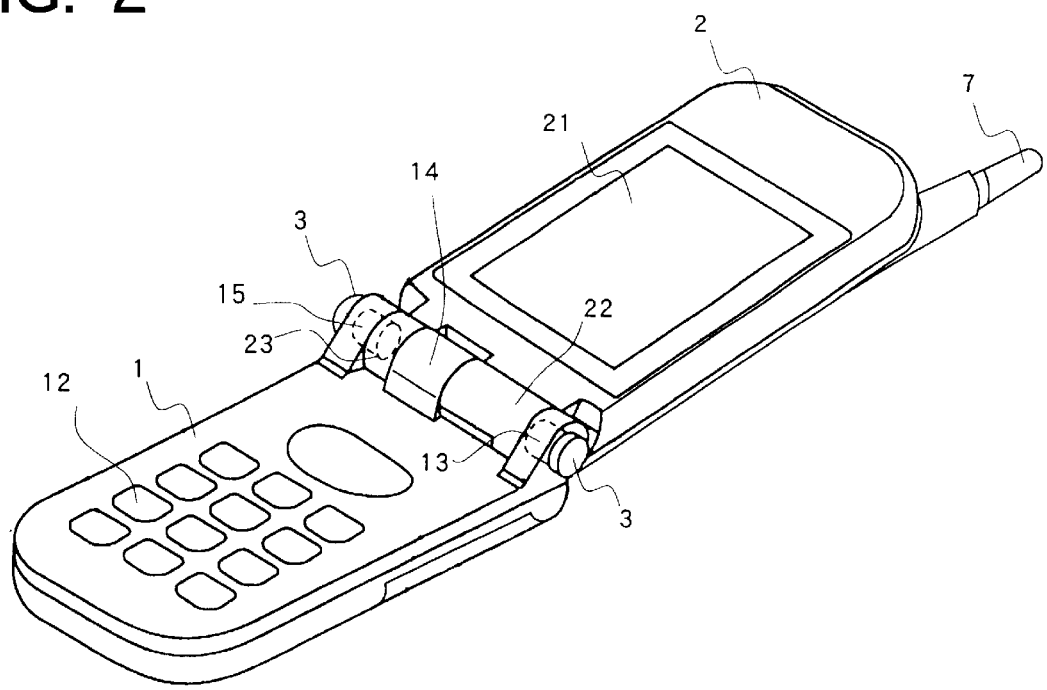
FIG. 2 is a perspective view of the foldable portable telephone, with its cases opened.

The present invention will be described below with reference to the drawings. The foldable portable telephone of the invention, as shown in FIGS. 1 and 2, comprises a main body case 1 provided with a plurality of manual keys 12, and a closure case provided with a liquid crystal display 21 and an extensible antenna 7, as connected to the main body case openably.

The main body case 1 is provided with a first barrel portion 13, a second barrel portion 14, and a third barrel portion 15, each in the form of a hollow cylinder. The closure case 2 is provided with a first barrel portion 22, and a second barrel portion 23, each in the form of a hollow cylinder. These barrel portions are arranged coaxially, and in meshing engagement each other. A hinge member 3 is fitted in central bores of the first barrel portion 13 of the main body case 1 and the first barrel portion 22 of the closure case 2, while the hinge member 3 is fitted in central bores of the third barrel portion 15 of the main body case 1 and the second barrel portion 23 of the closure case 2. The closure case 2 is adapted to be opened or closed about the two hinge members 3, 3.

Figure 3:
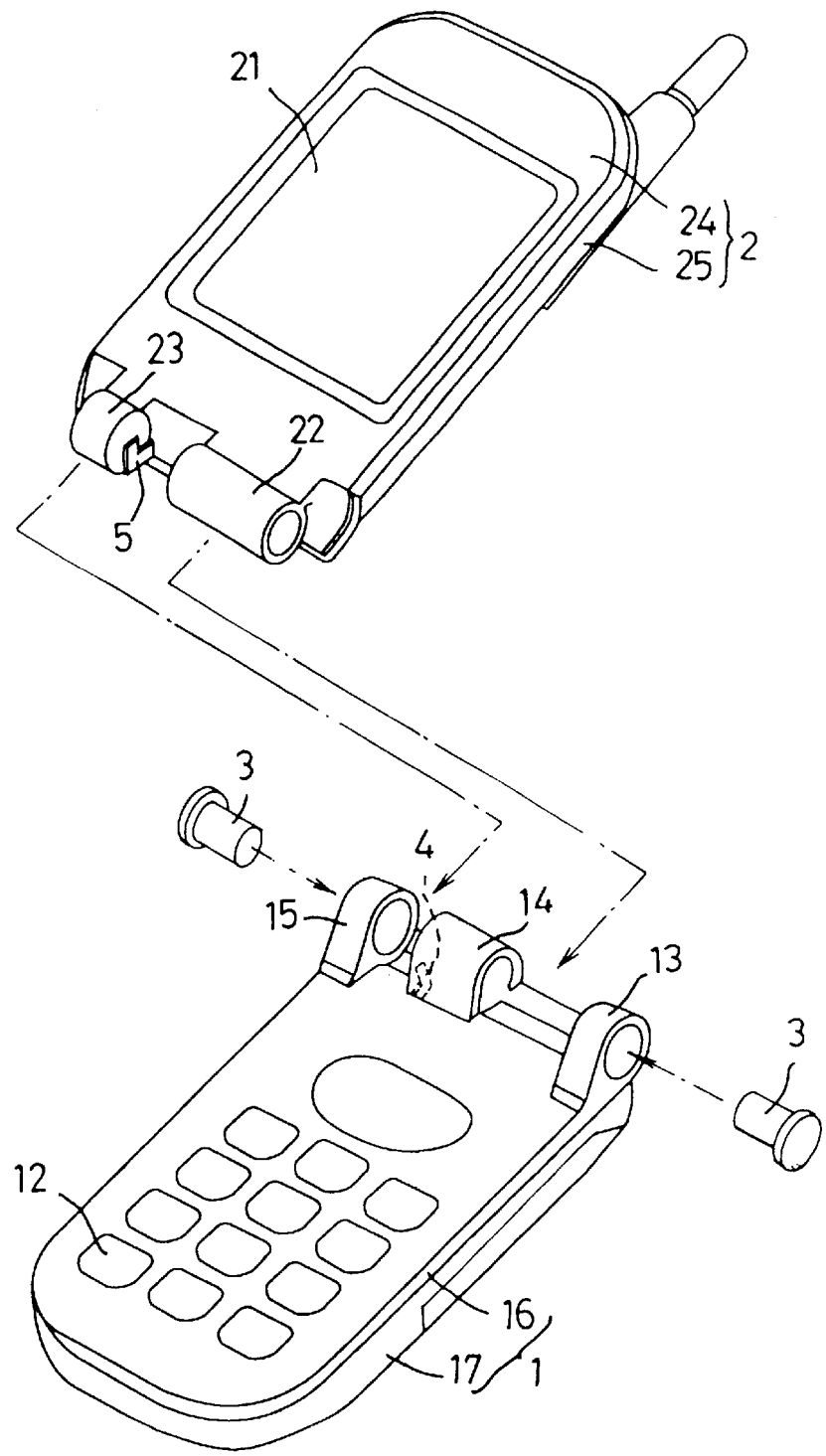
FIG. 3 is an exploded perspective view of the foldable portable telephone.

With the foldable portable telephone described, as shown in FIG. 3, while a contact piece on the main body 4 made of a metal plate, in the form of a letter "L", is provided on a left side surface of the second barrel portion 14 of the main body case 1, a contact piece on the closure 5 made of a metal plate, in the form of a letter "L", is provided on a right side surface of the second barrel portion 23 of the closure case 2, to detect the closure case 2 in its opened or closed state relative to the main body case 1. The portable telephone is so constructed as to detect the closed state of the closure case 2, when the closure case 2 is closed toward the main body case 1 to bring the contact piece on the closure 5 into slidable contact with the contact piece on the main body 4. Referring to FIG. 3, the main body case 1 comprises a pair of half body cases 16, 17 as combined, and the closure case 2 comprises a pair of half body cases 24, 25 as combined.

Figure 4:
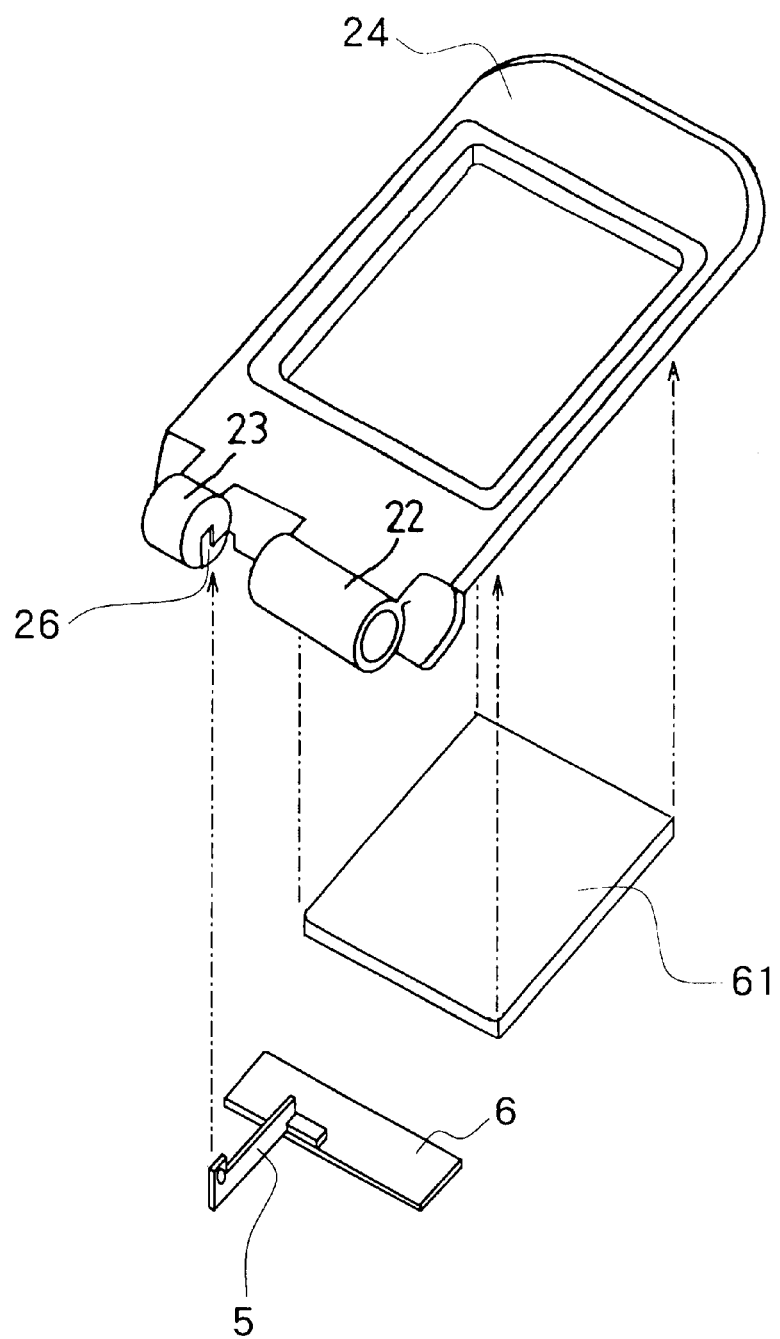
FIG. 4 is an exploded perspective view of a closure case.

With reference to FIG. 4, assembled into a rear portion of the front half body case 24 constituting the closure case 2 are a LCD unit 61 to constitute the display, a sub-board 6 formed with a circuit for controlling operation, etc. of the LCD unit 61. A base end of the contact piece on the closure 5 is secured to the sub-board 6 by soldering to have the piece connected to the circuit pattern (not shown) formed on the sub-board 6.

Figure 5:
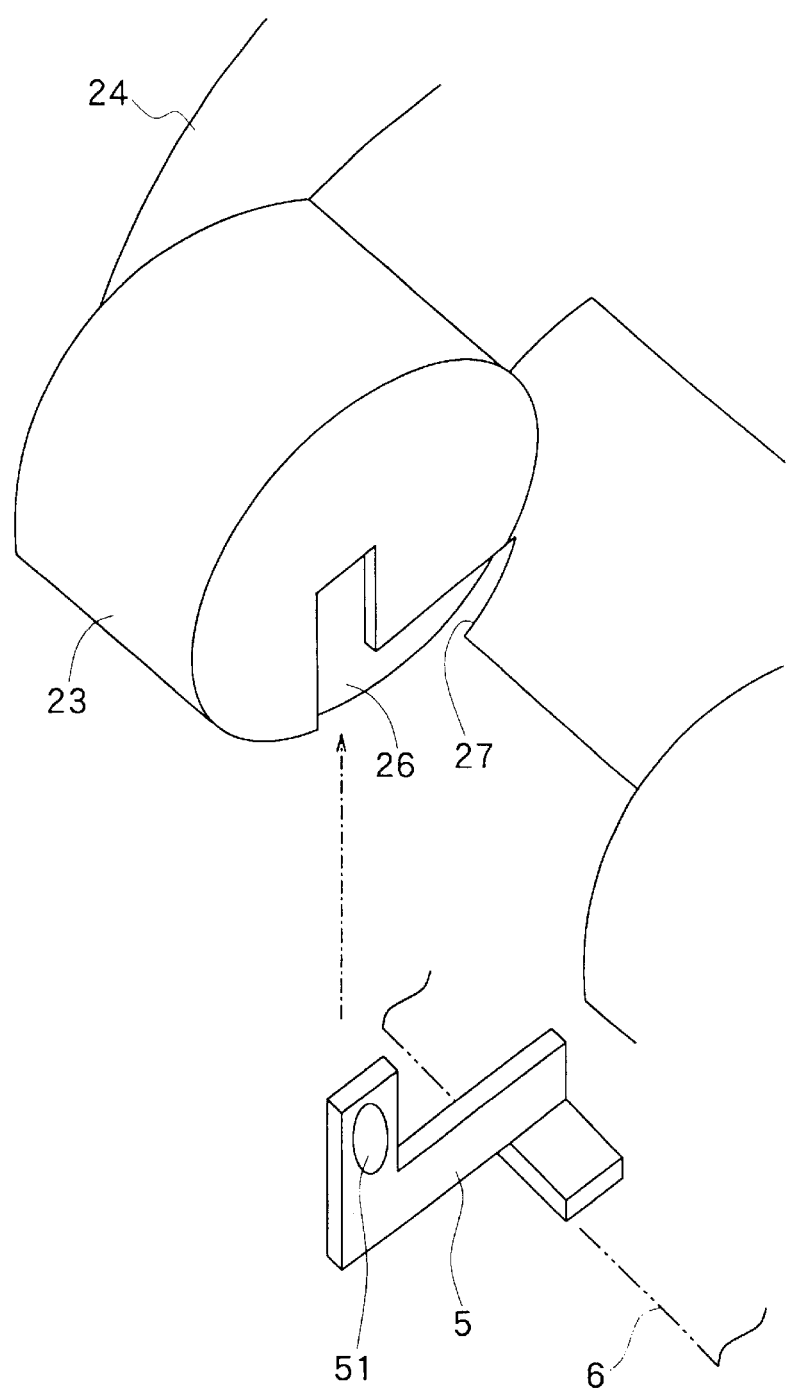
FIG. 5 is an enlarged perspective view showing a second barrel portion of the closure case and a contact piece on the closure, in separated state.
Figure 6:
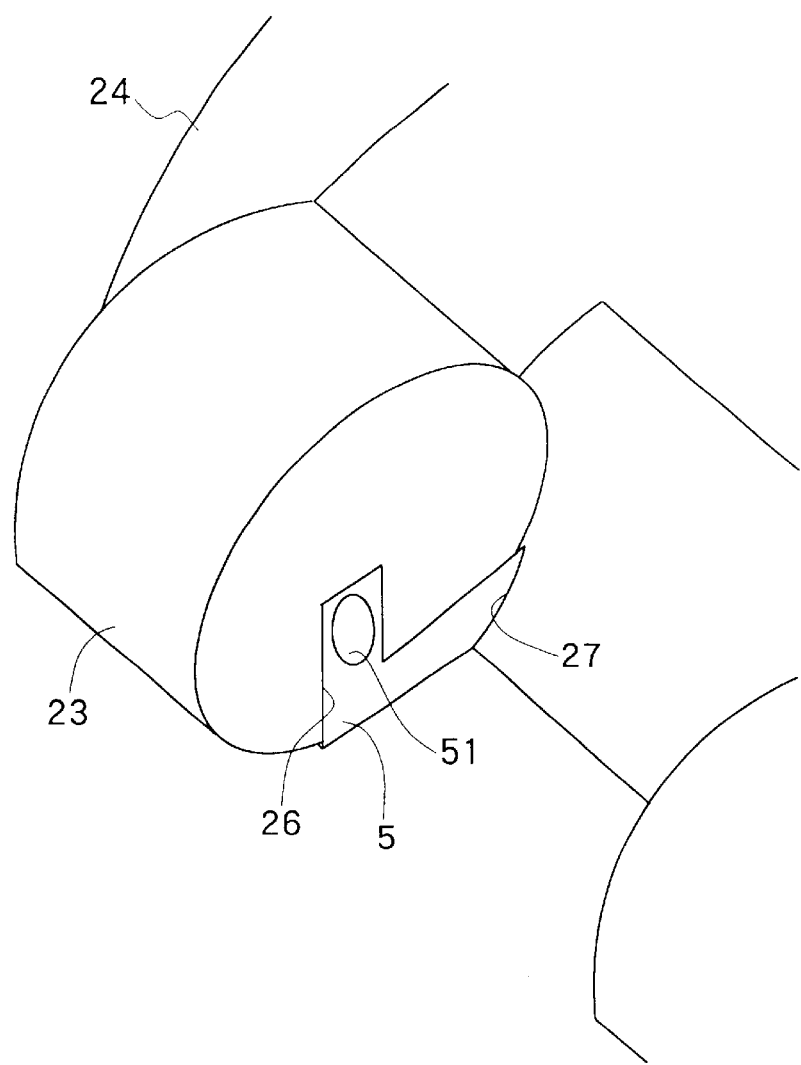
FIG. 6 is an enlarged perspective view showing the second barrel portion of the closure case and the contact piece on the closure, in assembled state.

As shown in FIG. 5, the half body case 24 is formed with a recessed portion 26 corresponding to the contour and the thickness of the contact piece on the closure 5 on the right side surface of the second barrel portion 23, and is provided with a cutout 27 into which the contact piece on the closure 5 is to be fitted. The sub-board 6 is assembled into the half body case 24, to have the contact piece on the closure 5 extended beyond the cutout 27 of the half body case 24, and further fitted into the recessed portion 26 of the second barrel portion 23, as shown in FIG. 6. The contact piece on the closure 5 is formed with a protruding portion 51 extending on its right side surface.

Figure 7:
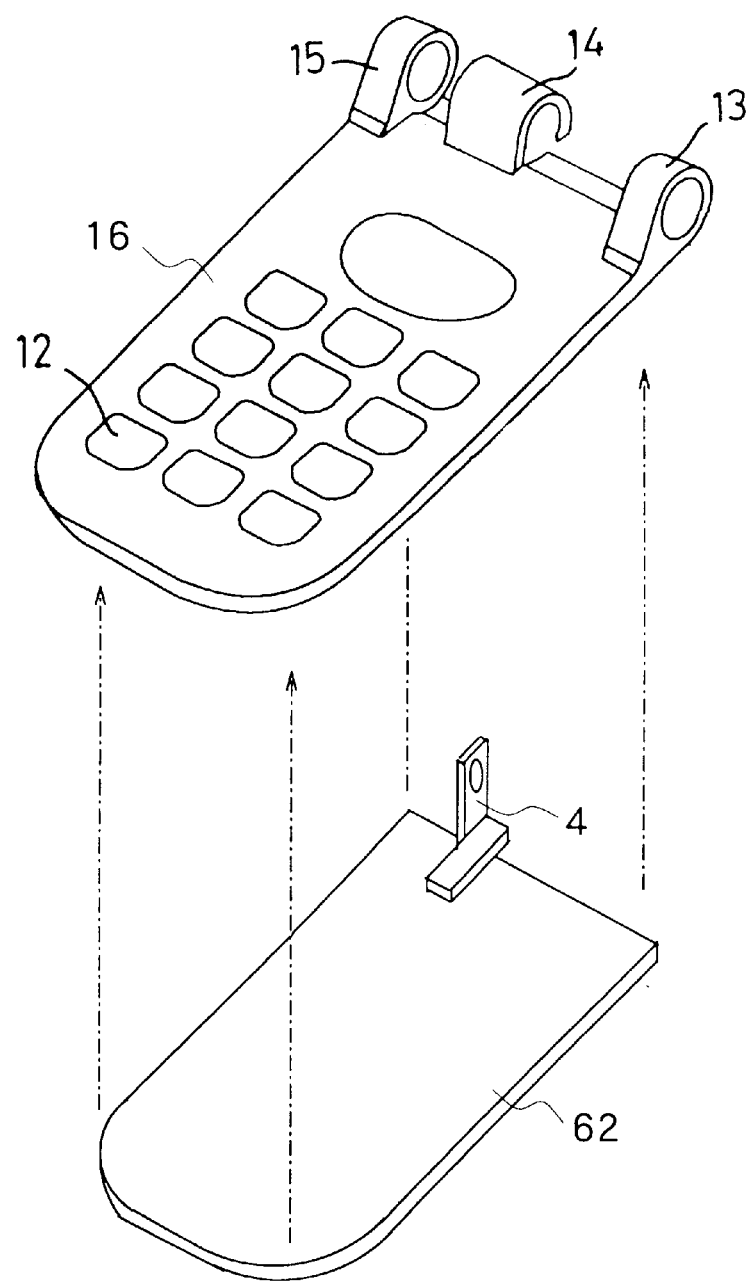
FIG. 7 is an exploded perspective view of a main body case.

With reference to FIG. 7, assembled into a rear portion of the front half body case 16 constituting the main body case is a main board 62 formed with a primary electronic circuit. A base end of the contact piece on the main body 4 is secured to the main board 62 by soldering to have the piece connected to the circuit pattern (not shown) formed on the main board 62. The circuit pattern formed on the sub-board 6 is, as well as the pattern formed on the main board 62, connected to the opening-closing detection circuit (not shown) on the main board 62.

Figure 8:
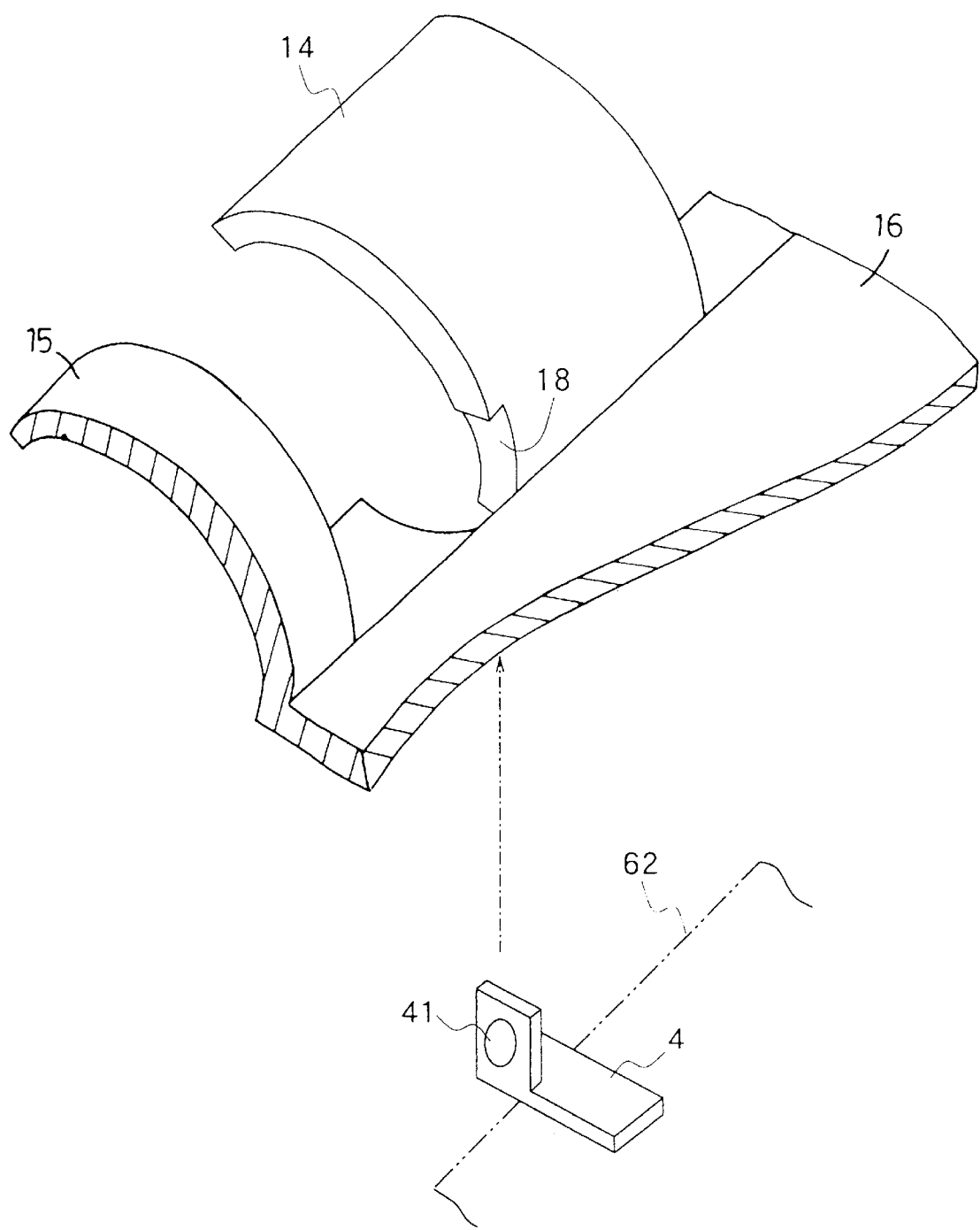
FIG. 8 is an enlarged perspective view showing a second barrel portion of the main body case and a contact piece on the main body, in separated state.
Figure 9:
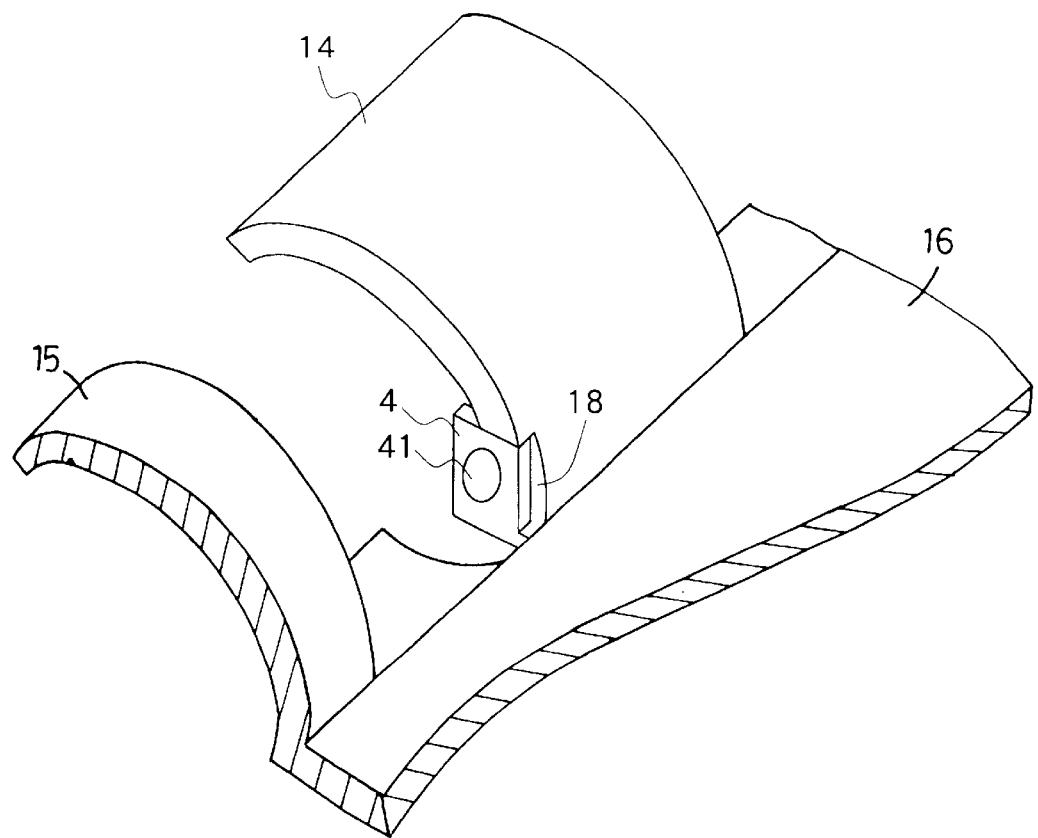
FIG. 9 is an enlarged perspective view showing the second barrel portion of the main body case and the contact piece on the main body, in assembled state.

The half body case 16, as shown in FIG. 8, is formed with a recessed portion 18 in a depth corresponding to the thickness of the contact piece on the main body 4 on the left side surface of the second barrel portion 14. The main board 62 is assembled into the half body case 16 to have the contact piece on the main body 4 fitted into the recessed portion 18 of the second barrel portion 14, as shown in FIG. 9. The contact piece on the main body 4 is formed with a protruding portion 41 extending on its left side surface.

Figure 10:
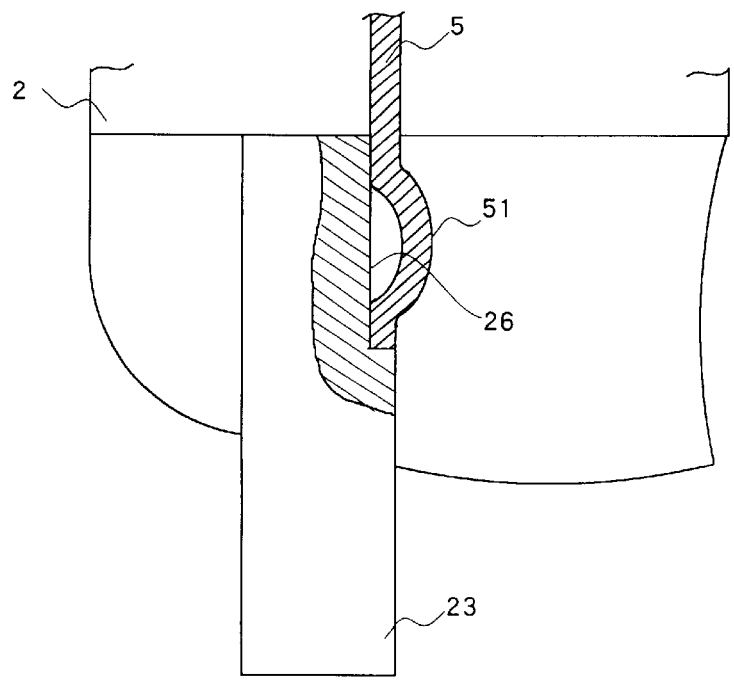
FIG. 10 is a plan view partly broken away and showing the second barrel portion of the closure case and the contact piece on the closure, in assembled state.
Figure 11:
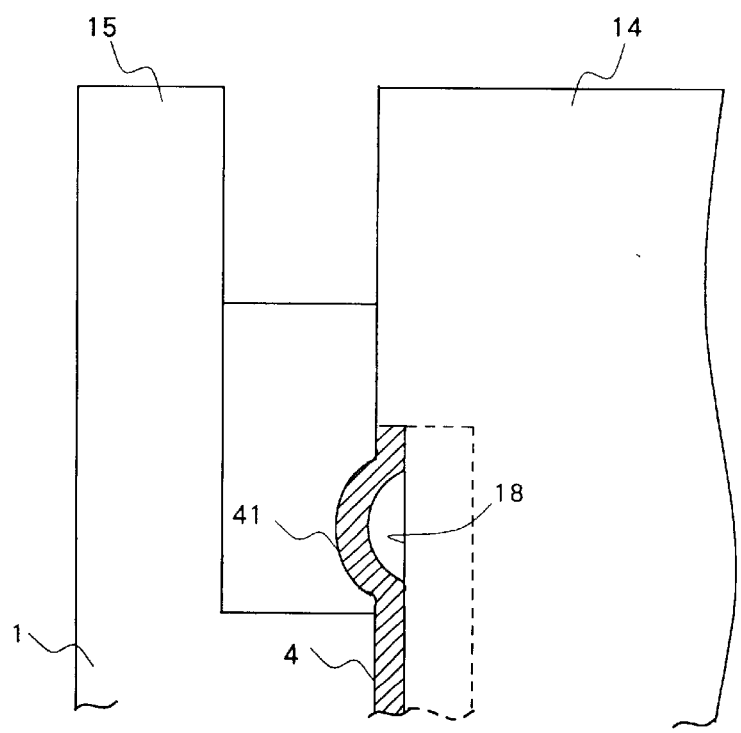
FIG. 11 is a plan view partly broken away and showing the second barrel portion of the main body case and the contact piece on the main body, in assembled state.

Referring to FIG. 10, with the right side surface of the contact piece on the closure 5, the area beside the protruding portion 51 is positioned on the same plane with the right side surface of the second barrel portion 23, and the protruding portion 51 slightly projects beyond the right side surface of the second barrel portion 23; the drawing shows that the protruding portion is convexly rounded. As shown in FIG. 11, with the left side surface of the contact piece on the main body 4, the area beside the protruding portion 41 is positioned on the same plane with the left side surface of the second barrel portion 14, and the protruding portion 41 slightly projects beyond the left side surface of the second barrel portion 14.

Figure 12:
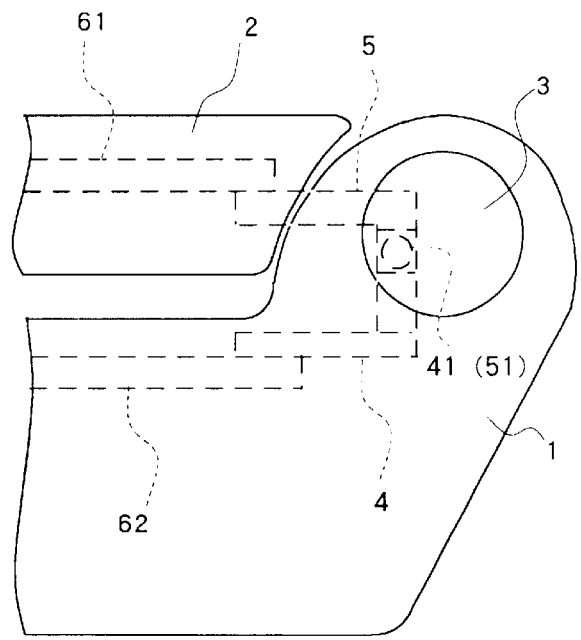
FIG. 12(a) is a side elevation showing the contact piece on the main body and the contact piece on the closure being in contact with each other, with the closure case opened/closed.
FIG. 12(b) is a side elevation showing the contact piece on the main body and the contact piece on the closure being away from each other, with the closure case opened/closed.
Figure 12:
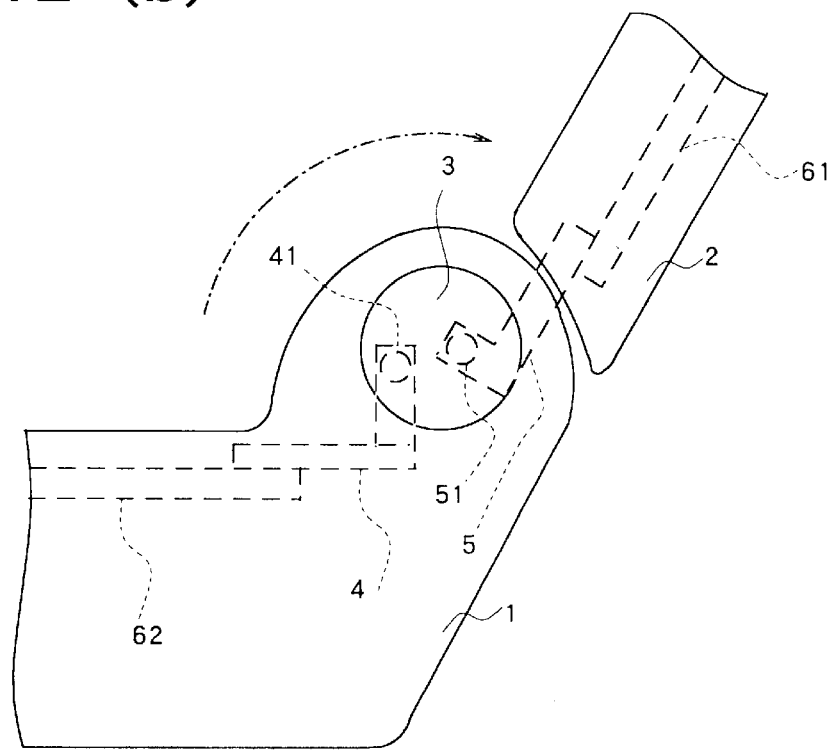

With the foldable portable telephone described, as shown in FIG. 12(a), when the closure case 2 is in its closed state toward the main body case 1, the protruding portion 41 of the contact piece on the main body 4 and the protruding portion 51 of the contact piece on the closure 5 are slidably in contact with each other to bring the switch into being closed, thus detecting the closure case 2 in its closed state. In the process of opening the closure case 2 to the full-open position shown in FIG. 12(b) from the closed state, the contact piece on the closure 5 is away from the contact piece on the main body 4 to bring the switch into being opened, detecting the closure case 2 in its opened state.

With the foldable portable telephone of the present invention, since the contact pieces 4, 5 for detecting opened-closed state of the closure case 2 are provided with use of the barrel portions 14, 23 originally formed on the junction of the main body case 1 and the closure case 2, the portable telephone can be made smaller than conventionally. Further, the two contact pieces 4, 5 can be respectively formed of a small metal piece, and expensive components are thus unnecessary, so that less expensive portable telephone can be provided than conventionally. Moreover, the contact pieces 4, 5 are adapted to be provided between the opposed faces of the barrel portions 14, 23, the main body case 1 and the closure case 2 are formed without a projection, hence safety. Furthermore, the opened-closed state of the closure case 2 is detected by the contact pieces 4, 5 of metal in contact with or away from each other, hence higher reliability.

With the foldable portable telephone described, the closure case 2 is slightly opened from the full-closed position to have the switch opened, which detects the closure case 2 in its opened state. The telephone, however, can also be so constructed as to detect opened state of the closure case 2 when the closure case 2 is opened to the full-open position.

Figure 13:
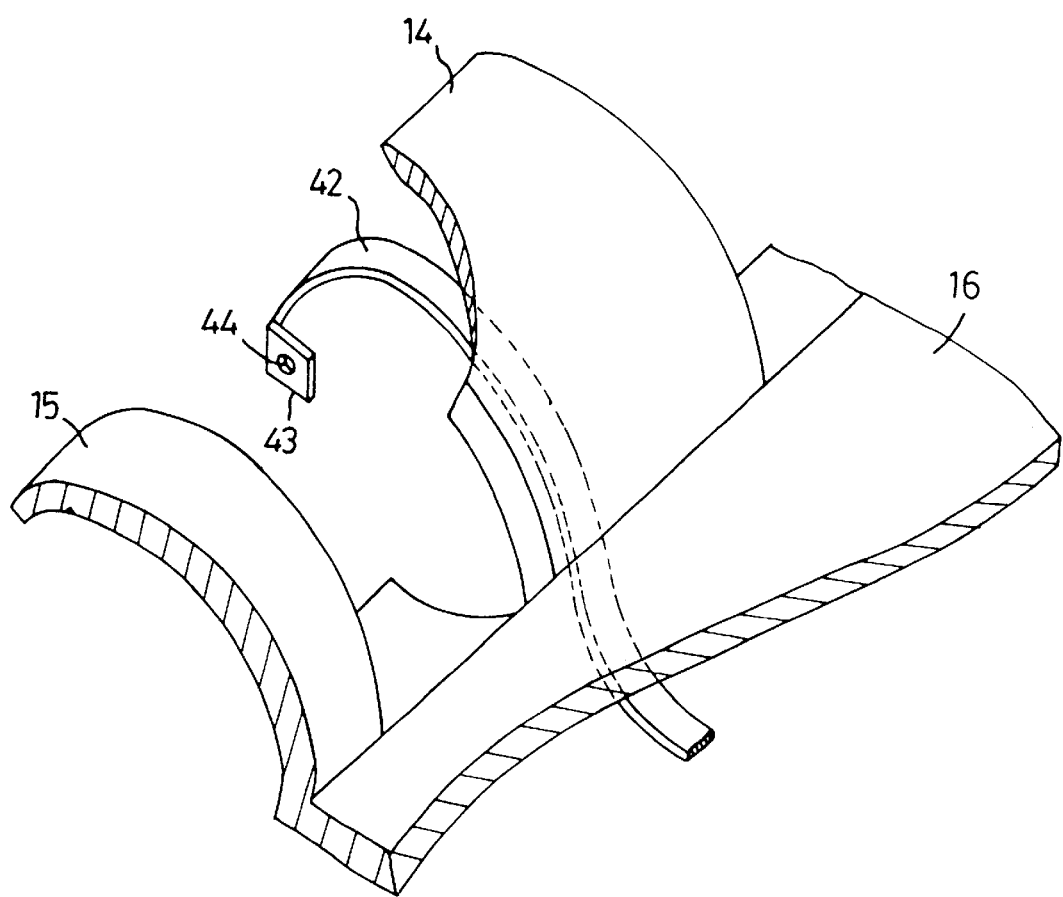
FIG. 13 is a perspective view partly broken away showing the second barrel portion of the main body case and the contact piece on the main body embodying other example.

FIG. 13 is to illustrate the embodiment of the construction stated above. Provided inside the half case body 16 of the main body case 1 is an electrode arm 42, in place of the contact piece on the main body 4 in the form of a letter "L", which is curved along the inner surface of the second barrel portion 14, and is in the form of a strip. The contact piece on the main body 43 is provided on an end portion of the electrode arm 42. A protruding portion 44 is formed on the left side surface of the contact piece on the main body 43.

Figure 14:
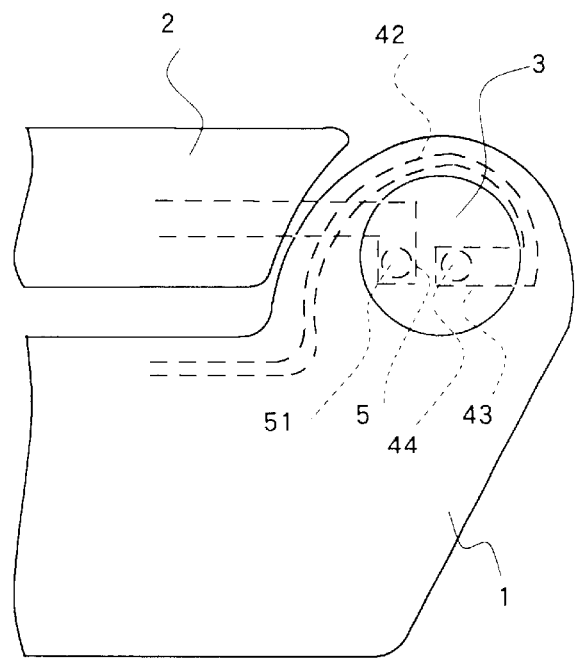
FIG. 14(a) is a side elevation showing the contact piece on the main body and the contact piece on the closure being away from each other, with the closure case opened/closed, embodying the other example.
FIG. 14(b) is a side elevation showing the contact piece on the main body and the contact piece on the closure being in contact with each other, with the closure case opened/closed, embodying the other example.
Figure 14:
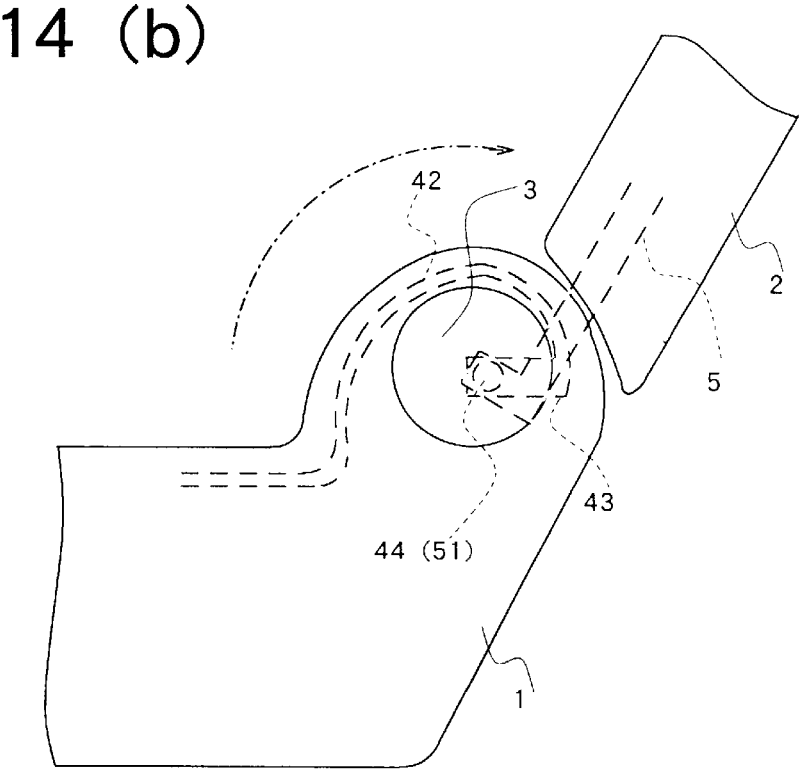
Figure 15:
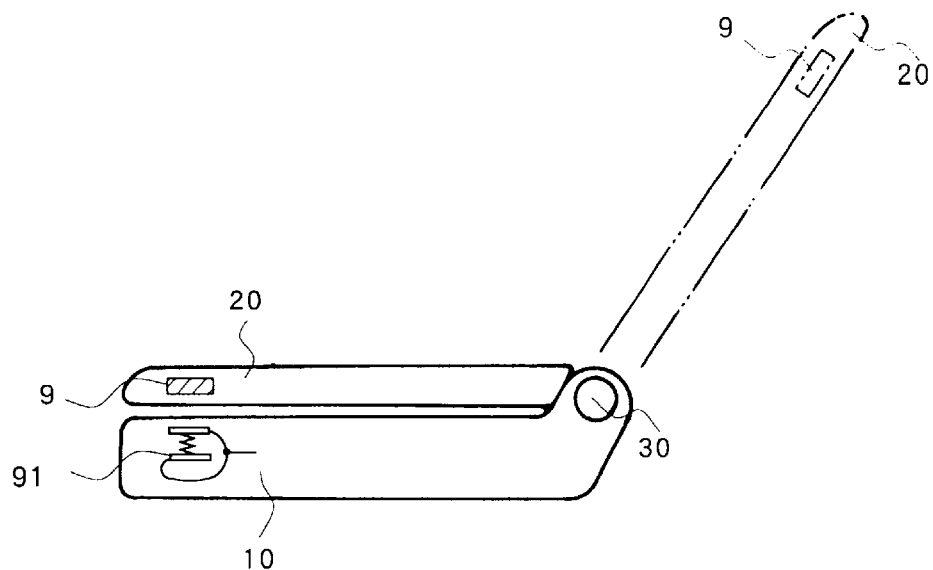
FIG. 15 is a side elevation partly broken away of a conventional foldable portable telephone.
Figure 16:
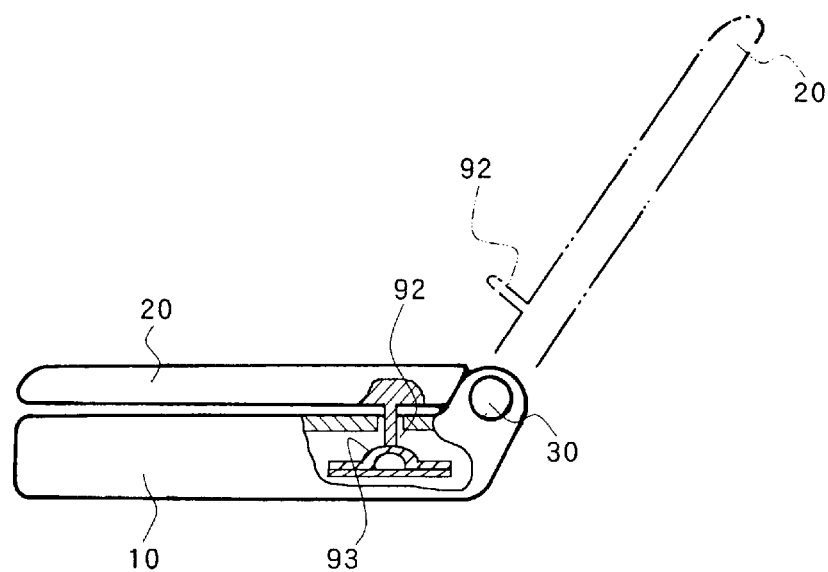
FIG. 16 is a side elevation partly broken away of the other conventional foldable portable telephone.

With the specific construction, when the closure case 2 is in its closed state, the contact piece on the main body 43 and the contact piece on the closure 5 are away from each other to have the switch opened, as shown in FIG. 14(a). Referring to FIG. 14(b), the closure case 2 is to be opened to the full-open state to cause the protruding portion 51 of the contact piece on the closure 5 to be slidably in contact with the protruding portion 44 of the contact piece on the main body 43, to have the switch closed, which detects the closure case 2 in its open state.

With the construction described, even though the closure case 2 is slightly opened, the switch is not closed, so that the user can confirm the caller with the closure case 2 slightly opened upon receiving a incoming call by setting to receiving a call when the switch is closed. Accordingly, the user may close the closure case 2 when an incoming call is placed by a caller to whom the user would not like to talk. This can save the power to be consumed.

What is claimed is:

1. A foldable portable telephone comprising a main body case (1) provided with manual keys (12), and a closure case (2) connected to the main body case (1) by a hinge mechanism for covering the manual keys (12), the telephone being adapted to detect electrically the closure case (2) in its opened state or closed state relative to the main body case (1), the main body case (1) and the closure case (2) being provided respectively with barrel portions (14), (23) being aligned coaxially with an axis of rotation of the hinge mechanism, contact pieces (4), (5) being provided respectively on opposed faces of the two barrel portions (14), (23), a convexly rounded protruding portion formed on at least one of opposed faces of the two contact pieces being adapted to be slidably in contact with the other opposed face, the two contact pieces (4), (5) being in contact with or away from each other corresponding to opening or closing the closure case (2), the foldable portable telephone detecting electrically the closure case (2) in its opened or closed state.

2. A foldable portable telephone according to claim 1 wherein the contact pieces (4), (5) of the two cases (1), (2) are provided at positions on which the pieces are adapted to be slidably in contact with each other when the closure case (2) is closed.

3. A foldable portable telephone according to claim 1 wherein the contact pieces (4), (5) of the two cases (1), (2) are provided at positions on which the pieces are adapted to be slidably in contact with each other when the closure case (2) is opened.

4. A foldable portable telephone according to claim 1 wherein the barrel portions (14), (23) of the two cases (1), (2) are respectively formed into a hollow cylinder which is coaxial with the axis of rotation of the hinge mechanism, and are slidably in contact with each other on the opposed faces, and the contact pieces (4), (5) are respectively accommodated into recessed portions (18), (26) formed in depth corresponding to thickness of the pieces (4), (5) on the opposed faces, and protruding portions (41), (51) being formed on opposed faces of the two contact pieces are slidably in contact with each other.

5. A foldable portable telephone according to claim 1 wherein the contact pieces are L-shaped respectively.

* * * * *

UNITED STATES PATENT AND TRADEMARK OFFICE
CERTIFICATE OF CORRECTION

PATENT NO. : 6,819,947 B2
DATED : November 16, 2004
INVENTOR(S) : Tatsumi Okuda and Motoaki Mushiga It is certified that error appears in the above-identified patent and that said Letters Patent is hereby corrected as shown below:

<u>Title page,</u>
Item [75], Inventors, the second inventor's name should be changed from "Mushiga" to
-- Mushika --; and the first inventor's address should be changed from "Gifu" to
-- Motosu-gun --.

Signed and Sealed this

Second Day of August, 2005

JON W. DUDAS
*Director of the United States Patent and Trademark Office*